UNITED STATES PATENT OFFICE.

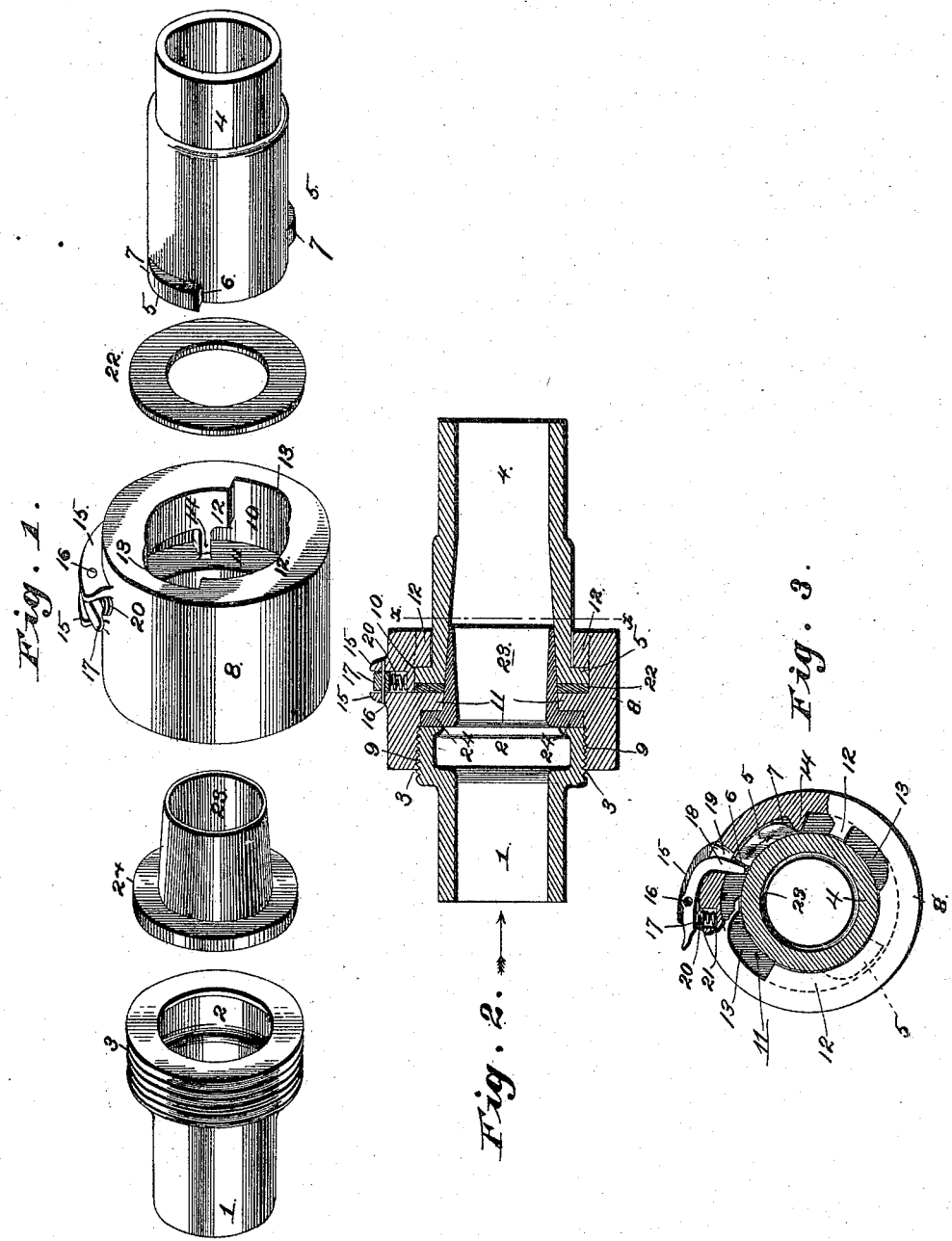

GUSTAF A. ANDERSON, OF OTTAWA, KANSAS.

HOSE-COUPLING.

SPECIFICATION forming part of Letters Patent No. 535,880, dated March 19, 1895.

Application filed September 8, 1894. Serial No. 522,464. (No model.)

*To all whom it may concern:*

Be it known that I, GUSTAF A. ANDERSON, a citizen of the United States, residing at Ottawa, Franklin county, Kansas, have invented certain new and useful Improvements in Hose-Couplings, of which the following is a full, clear, and exact description, reference being had to the accompanying drawings, forming a part hereof.

My invention relates to hose-couplers, and my object is to produce a device of this character which provides an absolutely water-tight joint; which can be put together and taken apart quickly and easily, and which is simple, strong, durable, and inexpensive of construction.

With this object in view, my invention consists in certain novel and peculiar features of construction and combinations of parts, as will be hereinafter described and claimed.

In order that the invention may be fully understood, I will proceed to describe it with reference to the accompanying drawings, in which—

Figure 1 is a perspective view showing all of the parts of the coupler detached from each other. Fig. 2 is a longitudinal sectional view of the coupling, and Fig. 3 is a transverse sectional view taken on the line $x$—$x$ of Fig. 2, and showing a part of the coupling broken away.

In the said drawings, 1 designates a short pipe-section, to which a hose is adapted to be attached in the ordinary or any preferred manner, and said section at one end is diametrically enlarged as shown at 2, and is externally screw-threaded as shown at 3.

4 designates a second pipe-section, which is adapted to be attached to another section of hose, and in diameter preferably corresponds to the section 1, and said section 4 is provided at diametrically opposite points externally with the outwardly projecting lugs or ears 5, and said lugs or ears are formed with abrubt shoulders 6 at one end, and have their opposite ends rounded or beveled as shown at 7, for a purpose which will be hereinafter explained.

8 designates the middle section or coupling-nut, which may be cylindrical in form, as shown, or externally angular if desired, and the passage of said coupling nut is internally screw-threaded at one end as shown at 9, and is cylindrically smooth at its opposite end, as shown at 10, and said screw-threaded and smooth surfaces 9 and 10, respectively, are separated by an inwardly projecting annular flange or shoulder 11. At the end of the coupling-nut provided with the cylindrical passage 10, at diametrically opposite points, the segmental shoulders 12 project inwardly for a suitable distance, so as to be apart a distance slightly exceeding the diameter of the section 4 of the coupling. These shoulders terminate at distances apart slightly exceeding the length of the lugs or ears 5, hereinbefore described, of the section 4, so as to form cavities or recesses 13, corresponding in contour with said lugs or ears, and one of said shoulders 12 is connected by the longitudinally extending stop-lug 14 with the annular flange or shoulder 11, so as to interrupt or break the passage between said flanges or shoulders, as clearly shown in Figs. 1 and 3. Externally projecting from the coupling-nut 8, are the parallel ears 15, and loosely mounted upon the pivot-pin 16, connecting said ears, is the pawl or dog 17, and said pawl or dog, at one end, is provided with an inwardly extending arm or tooth 18, which projects through an opening 19 in said coupling-nut and into the passage between the shoulders 11 and 12, and is normally held in this position by the expansion-spring 20, which occupies a recess or cavity 21 in said coupling-nut and bears at its upper end against the under side of the handle-end of said pawl or dog 17.

22 designates a washer of rubber ore quivalent material, which corresponds in diameter externally to the passage 10, and internally to the internal diameter of the annular flange or shoulder 11.

23 designates a packing-ring, which corresponds in diameter externally to the internal diameter of said flange or shoulder 11, the washer 22, and the end of the section 4 provided with the lugs or ears 5, and at one end is provided with the outwardly projecting and annular flange 24, which corresponds in diameter to the external diameter of the enlargement 2 of the section 1. To secure these several parts together in operative position so as to couple two sections of hose together, the washer 22 of elastic or yielding material is slipped within the coupling-nut 8 and fitted against the annular shoulder or flange 11, as shown in Fig. 2. The section 4 is now arranged with the lugs or ears 5, in longitudinal alignment or registering with the correspondingly contoured cavities or recesses 13 of the coupling-nut. The coupling-nut is now slipped upon said section 4 until the washer 22 engages the opposing end of said section 4. The said section is now rotatably twisted in the direction indicated by the arrow, Fig. 3, (or the coupling-nut is twisted in the opposite direction) so as to cause the lugs or ears 5 to pass behind the inwardly projecting shoulders or flanges 12, as clearly shown in dotted lines, Fig. 3. This movement causes the rounded or beveled end 7 of one of the lugs or ears of said section to engage the inwardly projecting arm or tooth 18, and pivotally operate the dog or pawl 17, to permit the said lug or ear to pass beyond said arm or tooth 18, and come into engagement with and be stopped by the stop-lug 14, which thus limits the rotatable movement of the sections in that direction. Immediately said lug or ear engages the lug 14, its opposite end has cleared or become disengaged from the arm or tooth 18, so as to permit the spring 20 to force said arm or tooth to its original position. It is now adjacent or opposed to the abrupt shoulder 6 of said lug or ear, so that it will be impossible for said sections to be uncoupled without first manipulating the said pawl or dog, as will be understood. The elastic ring 23 is now slipped from the opposite end of the coupling-nut into the position shown in Fig. 2, that is, with the body-portion of said ring projecting a suitable distance within the end of the section 4, and with the flange or shoulder 24 bearing against the flange or shoulder 11. In this position, it will be apparent that the joint between the section 4 and the coupling-nut is broken, so that it will be impossible for water to escape or leak at that point. The section 1, to which the other hose is attached, is now screwed firmly into place until it bears tightly against the flange or shoulder 24 of said ring 23, so as to prevent, also, the escape of water at that point. It will be apparent from this construction that the water forced through said coupling in the direction indicated by the arrow, Fig. 2, cannot leak or escape through the joints of said coupling, and that the pressure or force exerted by the water will only tend to cause said elastic or yielding ring 23 to more tightly cover and close said joints.

To uncouple, the pawl or dog is pivotally operated by pressing upon the same above the spring 20, so as to move the arm tooth or 18 out of the path of the lug or ear 5, to allow the said sections to be rotatably operated in a direction opposite to that already indicated until said lugs or ears again register with the cavities or recesses 13, when the section 4 and coupling-nut 8 may be pulled longitudinally apart.

It is to be understood that while I prefer to use the additional or auxiliary packing-ring 22, it may be dispensed with if desired, as the joint can be made equally effective with or without said packing-ring.

Having thus described my invention, what I claim as new, and desire to secure by Letters Patent, is—

1. A hose coupling, comprising a coupling-nut having an inwardly projecting annular flange or shoulder, internal screw-threads at one side of said flange or shoulder, and flanges or shoulders projecting inwardly at the opposite side of said flange or shoulder, in combination with a section having a screw-threaded portion engaging said internal threads, a second section rotatably fitting between the inwardly projecting flanges or shoulders at the opposite end of the coupling-nut, and provided with external lugs or ears fitting between said shoulders and the inwardly projecting annular flange or shoulder, and a ring fitting within the said annular flange or shoulder and the adjacent end of said section provided with the said ears or lugs, so as to break the joint between said section and the coupling-nut, and provided with an external annular flange or shoulder interposed between the annular flange or shoulder of the coupling-nut and the adjacent end of the screw-threaded coupling-section, substantially as set forth.

2. A hose coupling, comprising a coupling-nut having its passage screw-threaded at one end, an annular flange or shoulder projecting inwardly from said coupling-nut about midway its length, flanges or shoulders projecting inwardly from said coupling-nut at the opposite end from that occupied by the internal threads, and of length to form diametrically opposing recesses or cavities, and of width to leave a space between them and the adjacent side of the annular flange or shoulder, and a stop-lug interrupting or occupying the space between said annular flange and one of said flanges or shoulders, in combination with a pipe section fitting rotatably between said segmental flanges or shoulders, and having lugs or ears engaging the space between said flanges or shoulders and the annular shoulder of the coupling-nut, one of which lugs or ears engages the stop-lug, a second pipe-section, having external screw-threads engaging the internal threads of the coupling-nut, and a ring or band of flexible material fitting snugly within the annular flange or shoulder of the coupling-nut and projecting into the adjacent end of the first mentioned pipe-section, and provided with an external annular flange or shoulder which is tightly clamped between the annular flange or shoulder of the coupling-nut and the adjacent end of the screw-threaded pipe-section, substantially as set forth.

3. A hose coupling, comprising a coupling-nut having its passage screw-threaded at one end, an annular flange or shoulder projecting inwardly from said coupling-nut about midway its length, flanges or shoulders projecting inwardly from said coupling-nut at the opposite end from that occupied by the internal threads, and of length to form diametrically opposing recesses or cavities, and of width to leave a space between them and the adjacent side of the annular flange or shoulder, and a stop-lug interrupting or occupying the space between said annular flange and one of said flanges or shoulders, in combination with a pipe-section fitting rotatably between said segmental flanges or shoulders, and having lugs or ears engaging the space between said flanges or shoulders and the annular shoulder of the coupling-nut, one of which lugs or ears engages the stop-lug, a second pipe-section, having external screw-threads engaging the internal threads of the coupling-nut, a ring or band of flexible material fitting snugly within the annular flange or shoulder of the coupling-nut and projecting into the adjacent end of the first-mentioned pipe-section, and provided with an external annular flange or shoulder which is clamped between the annular flange or shoulder of the coupling-nut and the adjacent end of the screw-threaded pipe-section, and a spring-actuated dog or pawl having an arm or tooth projecting through an opening in the coupling-nut adjacent to and in the path of the lug or ear engaging said stop-lug, so as to prevent in conjunction with said stop-lug the rotatable movement of the coupling-nut and said pipe-section provided with said lug or ear, substantially as set forth.

4. A hose coupling, comprising a coupling-nut having its passage screw-threaded at one end, an annular flange or shoulder projecting inwardly from said coupling-nut about midway its length, flanges or shoulders projecting inwardly from said coupling-nut at the opposite end from that occupied by the internal threads, and of length to form diametrically opposing recesses or cavities and of width to leave a space between them and the adjacent side of the annular flange or shoulder, and a stop-lug interrupting or occupying the space between said annular flange and one of said flanges or shoulders, in combination with a pipe-section fitting rotatably between said segmental flanges or shoulders and having lugs or ears engaging the space between said flanges or shoulders and the annular shoulder of the coupling-nut, one of which lugs or ears engages the stop-lug, a second pipe-section, having external screw-threads engaging the internal threads of the coupling-nut, a ring or band of flexible material fitting snugly within the annular flange or shoulder of the coupling-nut and projecting into the adjacent end of the first-mentioned pipe-section, and provided with an external annular flange or shoulder which is clamped between the annular flange or shoulder of the coupling-nut and the adjacent end of the screw-threaded pipe-section, and a spring-actuated dog or pawl having an arm or tooth projecting through an opening in the coupling-nut adjacent to and in the path of the lug or ear engaging said stop-lug, so as to prevent in conjunction with said stop-lug the rotatable movement of the coupling-nut and said pipe-section provided with said lug or ear, and a packing-ring of flexible material interposed between the annular flange or shoulder of the coupling-nut and the opposing end of the pipe-section provided with said lugs or ears, substantially as set forth.

In testimony whereof I affix my signature in presence of two witnesses.

GUSTAF A. ANDERSON.

Witnesses:
W. B. CUSICK,
F. M. HEDGES.